H. C. SMITH.
WORK SUPPORT FOR ROTARY SHEARS.
APPLICATION FILED AUG. 31, 1916.

1,259,306.

Patented Mar. 12, 1918.
9 SHEETS—SHEET 4.

Inventor
Henry Collier Smith
By Pagelsen and Spencer
Attorneys

Witness
E. R. Barrett

UNITED STATES PATENT OFFICE.

HENRY COLLIER SMITH, OF DETROIT, MICHIGAN.

WORK-SUPPORT FOR ROTARY SHEARS.

1,259,306. Specification of Letters Patent. Patented Mar. 12, 1918.

Application filed August 31, 1916. Serial No. 117,818.

*To all whom it may concern:*

Be it known that I, HENRY COLLIER SMITH, a citizen of the United States, and a resident of Detroit, in the county of Wayne and State of Michigan, have invented a new and Improved Work-Support for Rotary Shears, of which the following is a specification.

This invention relates to means for centering and supporting sheets and plates so that circular disks may be cut therefrom correctly by means of revolving cutters, and its object is to provide a supporting device which will automatically move to proper position under the stress of the cutters. The words rotary shear usually designate the tool as a whole, while the cutting members are usually termed cutters.

Rotary shears are substantially universally used to sever sheets and plates along curved lines, and it has been found, in cutting circles, that it is necessary for the active cutting edges of the cutters to engage on a line at right angles to the radius of the circle being cut. If the angle between the cutting edges of the rotary cutters and the radius of the circle is greater than ninety degrees, the curve cut will be a decreasing spiral, while if the angle is less than ninety degrees, the curve will be an increasing spiral. To remedy this difficulty, the center of support of the sheet must be swung to change the angle in question to ninety degrees. In the present invention, this is done automatically.

This invention consists in combination with a pair of rotary cutters, of a support for sheets and plates which permits them to be revolved freely by the cutters, and an adjustable mounting for the support which causes the support to move transversely across the general line of the shear in either direction, according to the radial stress exerted by the cutters on such mounting.

In the accompanying drawings, Fig. 4 is an elevation of the work support taken from the right in Fig. 1.

Similar reference characters refer to like parts throughout the several views.

The rotary shear shown in connection with the present work support is of the same general construction as that shown in my prior Patent No. 1,063,298, dated June 3rd, 1913, and consists of a main frame 1 having an overhanging support 2 for the upper cutter 3 that coöperates with the lower cutter 4; these cutters being formed of zones of cones, tipped with respect to the plane of the work 5, and with respect to each other, the tipping and the shaping of the cutters being arranged with respect to each other so that planes perpendicular to the axes of the shafts carrying the cutters and passing through their cutting edges cross each other (on what may be termed a "cutting line"), and surfaces of the two cutters are tangential to two parallel planes that are very close together so that the cutters can be moved to pass each other while maintaining their shearing relations (which two planes may be considered as one and called the "plane of shear"), together with means embodying the screw 6 and hand wheel 7 for moving the upper cutter in a path parallel to the plane of shear.

This rotary shear may be driven by any desired mechanism within a casing 8, which mechanism may terminate in a hub 9 which is loose on the main shaft 10, but may be connected thereto by means of the clutch member 11 under the action of the lever 12. The details of this rotary shear may be found in my prior patent.

When the rotary cutters are used to cut sheets along irregular lines, the work must usually be guided by hand. But when such devices are to cut a circle, means must be provided to insure the center of the circle and the support of the work being in a line passing through the cutting line of the cutters at right angles to the plane of shear. In such case, the cutters will revolve the work around its center and no tendency will exist to move the center either toward or from the cutters or for the cutters to follow any line but a circle.

The work may be sheets of steel or other metal, or artificial boards of paper, fiber or veneering. It may have a hole punched in the center of each circle to be cut, but in that case the absolute position of the center is more easily determined than where such holes are not permissible. It must be understood that the upper cutter 3 is not moved down the same distance for each piece of work to be cut and that therefore the line of shear and the plane of shear will vary with practically each sheet. I prefer the work 5 to be held between the collars 15 and 16 shown in Fig. 7, which collars are respectively carried by the upper member 17 and lower member 18 of the work support.

This work support is rigid in that it is of one piece or acts as one piece, in contradistinction to a support formed of a plurality of pieces linked or pivoted together, one of which carries the holder for the work and another mounted on the pivot which carries the work support, these two pieces permitting a change of the distance between the work engaging devices and the pivot on which the work support is mounted.

Figures 7, 13:
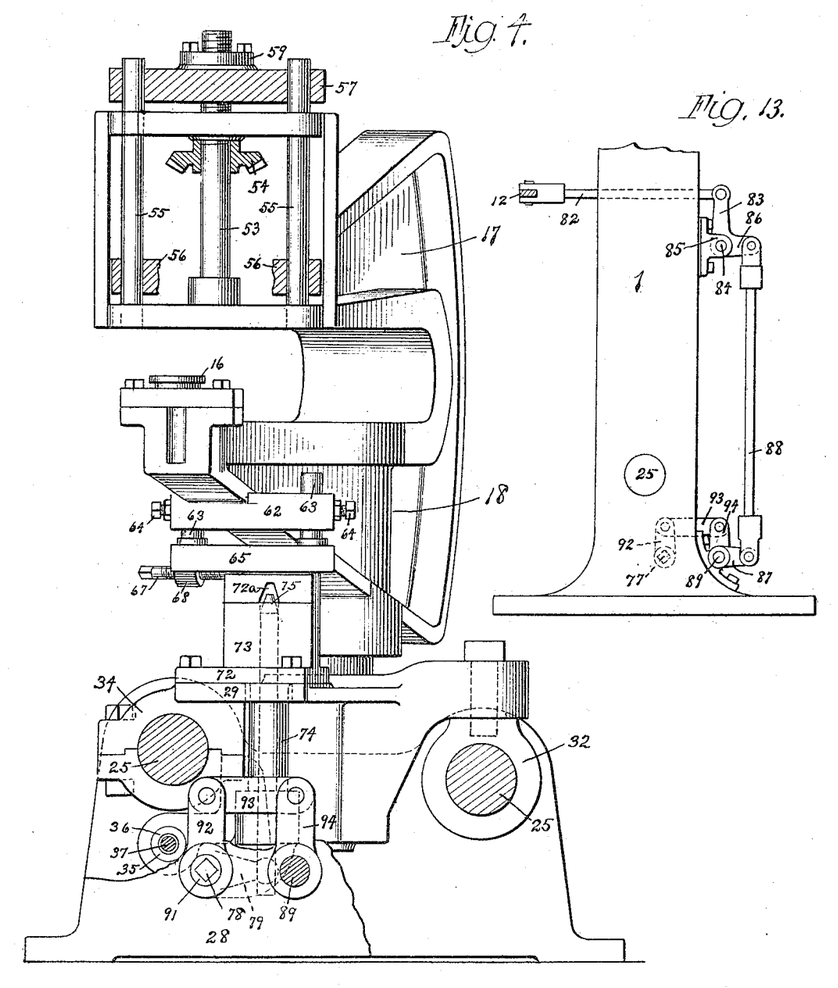
Fig. 7 is a similar section of the ball-bearing jaws that immediately engage the work.
Fig. 13 is a detail of a locking mechanism.
Figure 7:
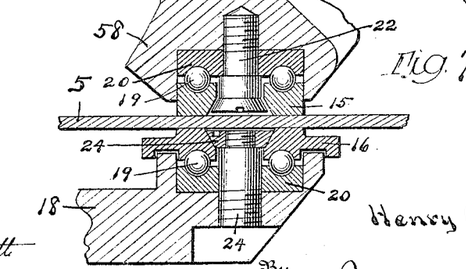

The collars 15 and 16 are shown formed with grooves for the balls 19 that also lie in grooves in the bearing collars 20. The upper collar may be held in place by a screw 22, while the lower collar is shown held in place by a nut 23 on a stud 24. Any other freely rotatable devices may be employed.

Extending from the main frame 1 of the shear and through the lugs 26 and 27 on the bed 28 are two heavy shafts 25, one of which keeps the bed 28 and frame 1 in proper alinement. Slidable on these shafts is a carriage consisting of a frame 29, a cross bar 30, a sleeve 32 secured to one end of this cross bar, the bearing 33 on the other end of the cross bar and the second bearing 34 on the front end of the frame. A nut 36 (Fig. 3) receives a screw 37 extending below the plane of the shafts 25 and mounted in a bearing 38 at the front end of the bed, and carrying a bevel gear 39. A short shaft 41 is mounted in a bracket 42 carried on the front shaft 25, and this shaft 41 carries a crank handle 43 and a bevel gear 44 that meshes with the gear 39, so that the carriage may be moved toward or from the cutters and thus change the distance between the cutters and the pivot for the work as desired. The bolts 45 in the bearings 33 and 34 may be screwed down to hold the carriage in any desired position.

Figure 1:
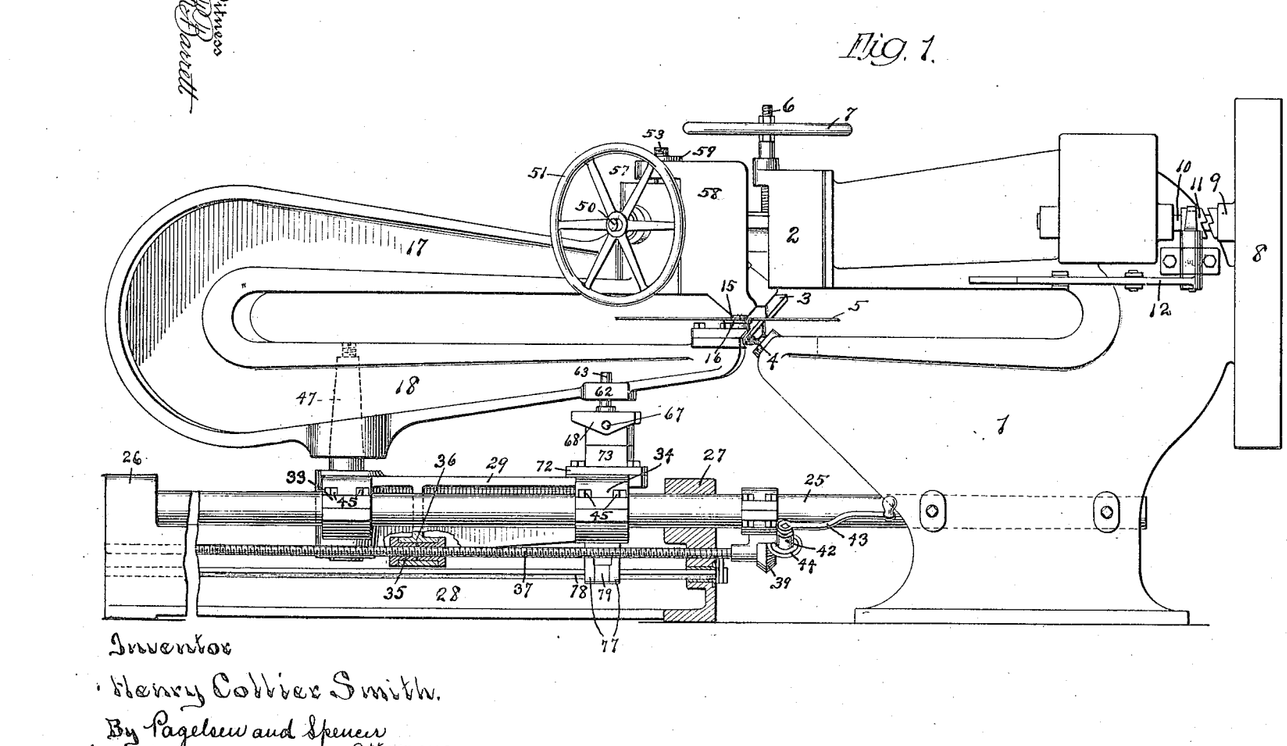
Figure 1 is a side elevation of a rotary shear provided with a work support embodying this present invention.
Figure 5:
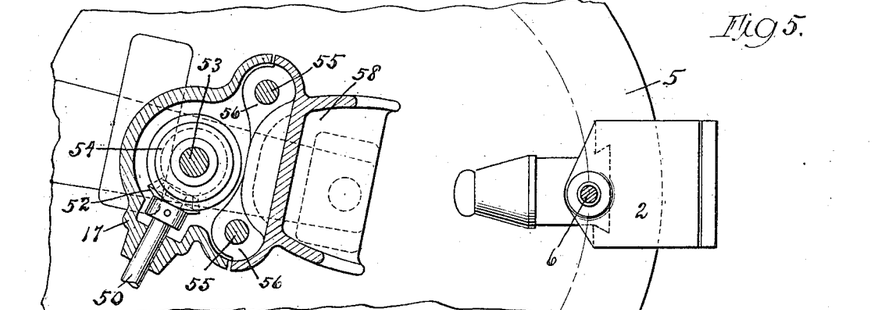
Fig. 5 is a horizontal section on the line 5—5 of Fig. 6 of the upper member of a pivotal clamp for the work.
Figure 6:
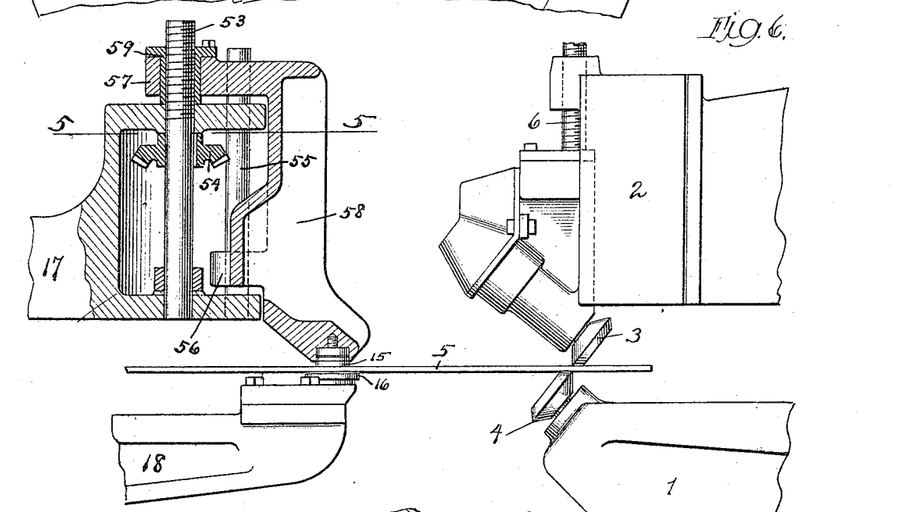
Fig. 6 is a vertical longitudinal section thereof.

A tapering pivot 47 carried by the carriage extends up into the lower member 18 of the work support which turns freely upon this pivot. A screw 48, indicated in dotted lines in Fig. 1, receives the thrust and prevents the pivot from binding in the work support. Mounted in the upper member 17 of the work support is a shaft 50, on one end of which is a hand wheel 51, and on the other end a bevel gear 52 that meshes with the bevel gear 54 (Figs. 5 and 6) on the screw 53, mounted vertically in the end of this member 17. Two guide rods 55 adjacent the screw 54 pass through lugs 56 and the upper flange 57 of the head 58 that carries the upper collar 15 of the work pivot. This flange 57 is bored to receive the nut 59 for the screw 53. It will be apparent that sheets can be firmly clamped between the collars 15 and 16 and quickly released by turning the hand wheel 51.

Connected to the lower side of the part 18 of the work support, and between the work pivot and the pivot 47, and preferably nearer the former, is a block 62 (Fig. 4) having vertical holes in which pins 63 are slidable but normally held immovable by means of the screws 64. These pins carry the guide block 65 having a dove-tail groove (Fig. 9) in which a block 66 is slidably mounted. A screw 67 is threaded in the lug 68 on the block 66 and is locked in place by means of a nut 69. Its opposite end is threaded in the opposite direction and screws into the threaded hole 70 in the block 66 which may thereby be positioned by means of this screw.

The block 66 is formed with a groove 72$^a$, preferably in alinement with a line connecting the work pivot with the pivot 47 of the work holder.

Mounted on the carriage is a plate 72 having an upwardly extending hub 73 and a downwardly extending hub 74, in which a locking pin 75 is vertically slidable. Mounted on the lower end of the lower hub is a bracket 76 provided with parallel arms 77, between which, on the square shaft 78, is a crank arm 79 having a rounded end that extends into a slot 80 in the lower end of the locking pin 75.

Figures 2, 3:
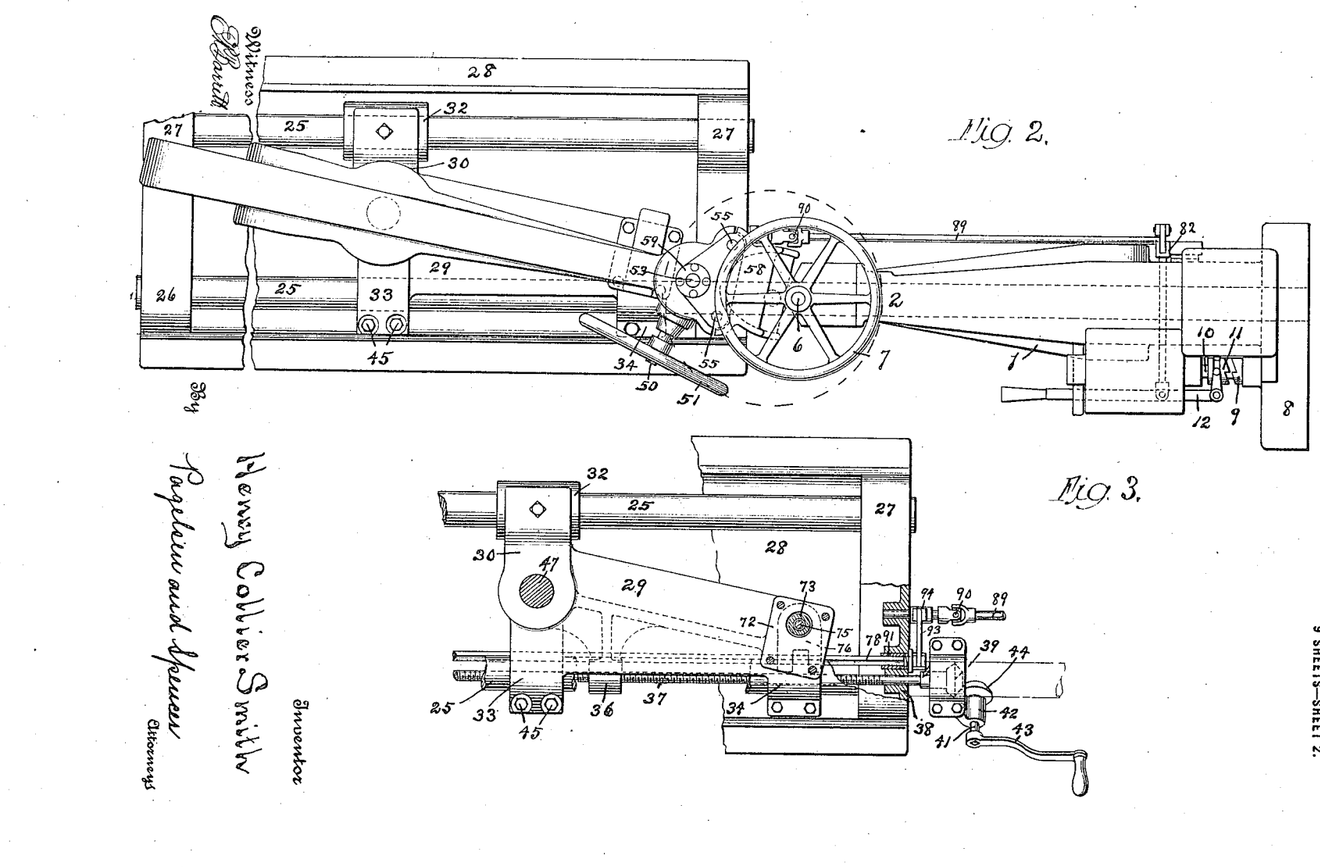
Fig. 2 is a plan thereof.
Fig. 3 is a plan of the mounting of the work support.

This locking pin is operated by the clutch lever 12 in the following manner (see Fig. 13). Connected to this lever is a link 82 that extends through the frame 1 and connects to the upper end of a crank arm 83 on the shaft 84, carried by a bearing 85 secured to the frame 1. This shaft carries another crank arm 86 that connects to a crank arm 87 on the shaft 89 by means of a link 88. This shaft is in several parts connected by universal couplings 90, and the end opposite the crank arm 86 is mounted in the bed 28, as shown in Fig. 3, and carries a crank arm 94.

A sleeve 91 is journaled adjacent the crank arm 89 and has a rectangular hole to receive the square shaft 77. A crank arm 92 is connected to this sleeve and a link 93 connects the crank arms 94 and 92 as shown in Fig. 4. When, therefore, the lever 12 is forced in to start the cutters, the locking pin is pulled down substantially out of the groove 72$^a$ to release the work holder. The operation of this device is as follows:—

*Operation.*

Figure 11:
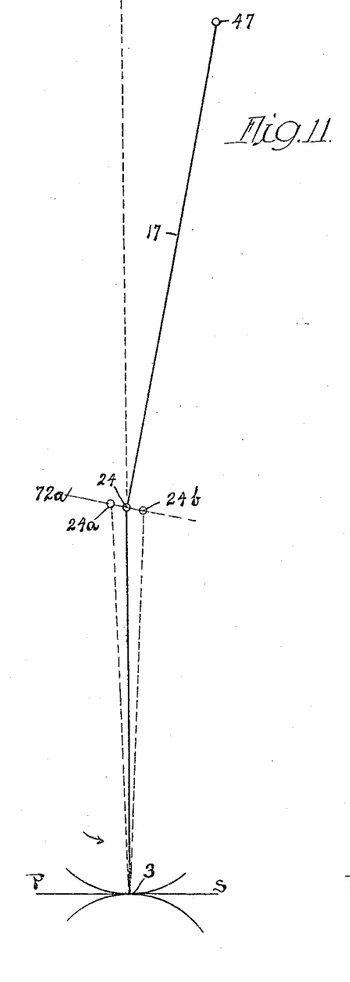
Figs. 11 and 12 are diagrams illustrating the action of the work holder.

The work must either be formed with a small round hole at the center of the circle to be cut, in which case the pin 24 may be formed a little longer to enter such hole, or a small circle is inscribed around the center. The sheet is slipped between the collars 15 and 16 of the work pivot, and after it is positioned, the collar 15 is forced down by means of the hand wheel 51, which caused the work to be tightly gripped. The upper cutter 3 is then forced down through the work by means of the hand wheel 7, and the cutters are set in motion by means of the lever 12, the pin 75, which thus far had been holding the work support from swinging being pulled down at the same time. This pin serves to prevent the work holder from swinging on its pivot while the work is being slid in between the ball-bearing collars. The cutters are self-feeding and exert no radial stress on the work so long as the plane of shear is at right angles to the radius of the circle being cut. Referring now to Fig. 11: The two cutters are indicated as tangent to the plane of shear P—S at 3. A line at right angles to this plane will pass through the line 72$^a$ (being the diagrammatic location of the groove 72$^a$) at 24, and so long as the pivot of the sheet is at 24, the cutters will not tend to change the position of this pivot. If, however, the pivot is at 24$^a$, the cutters will tend to cut a decreasing spiral and therefore pull hard on the line 3—24$^a$, sufficiently to cause the arm 17 or the work holder to swing until the pivot of the work is at 24, when the radial pulling stress ceases. On the other hand, if the center is at 24$^b$, the cutters will tend to cut an increasing spiral and therefore push on the line 3—24$^b$, and cause the arm 17 to swing until the pivot of the work is again at 24.

The point 47 must always be on the side of the line 3—24 extended opposite to the direction in which the work is moving under the cutters, and this angle is preferably about twenty degrees. The possible distance between the points 24$^a$ and 24$^b$ is usually quite small, not over two degrees of movement of the work holder.

Figure 12:
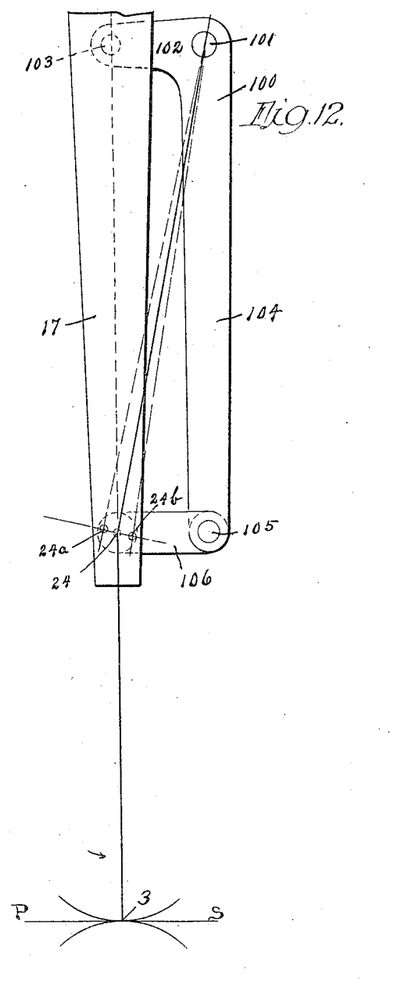
Figures 14, 15:
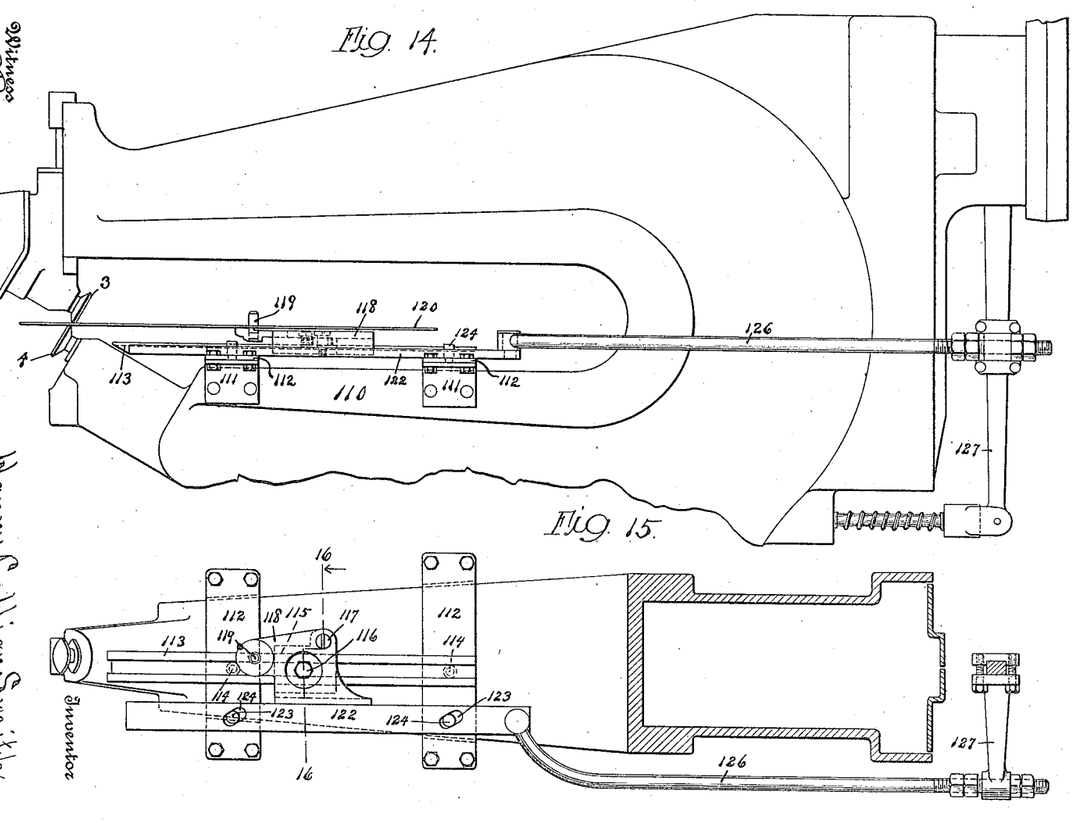
Fig. 14 is a side elevation of a work support mounted in the throat of a rotary shear.
Fig. 15 is a plan of this work support.
Figure 16:
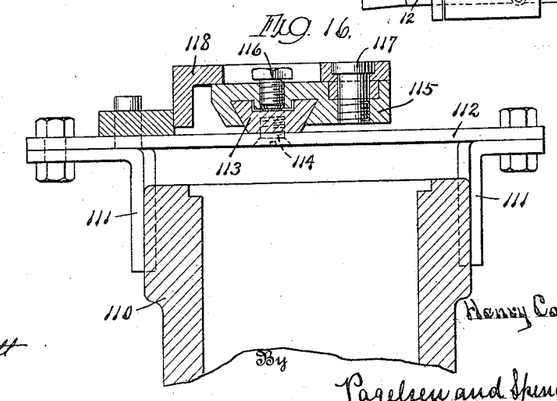
Fig. 16 is a section on the line 16—16 of Fig. 15 on a larger scale.
Figure 17:
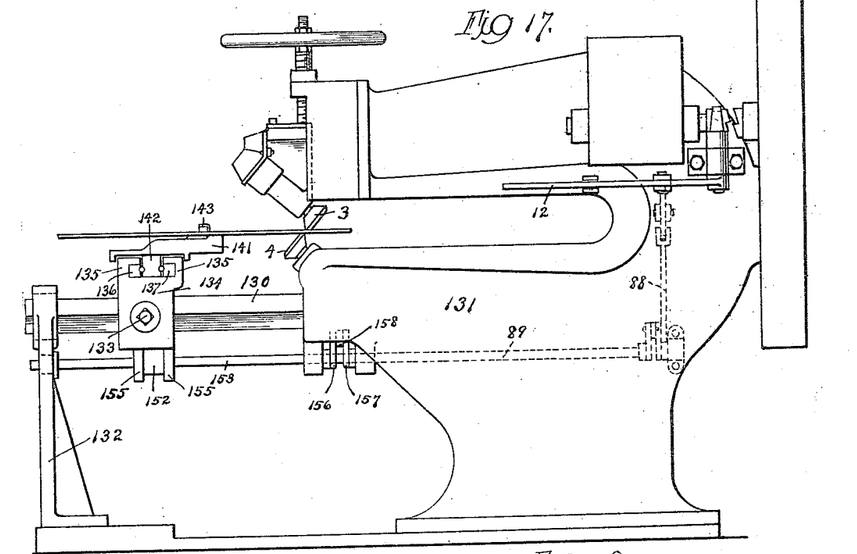
Fig. 17 is a side elevation of a rotary shear provided with another form of work support embodying this invention.
Figure 18:
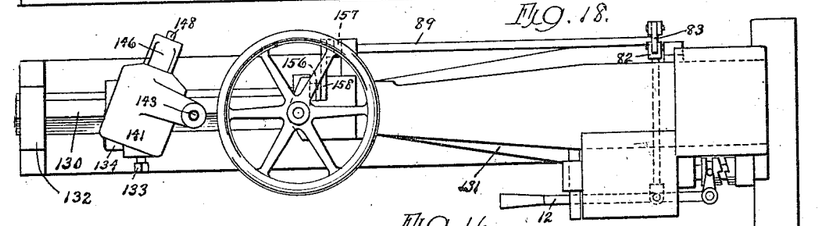
Fig. 18 is a plan thereof.
Figures 19, 21:
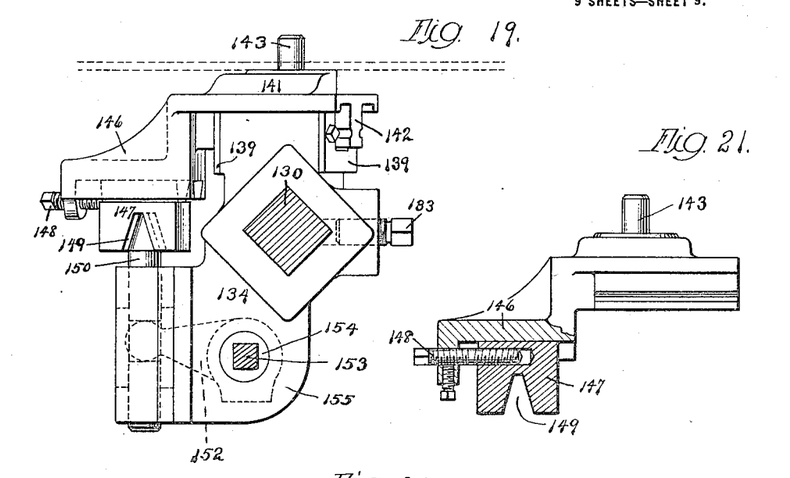
Fig. 19 is a front elevation of this work support.
Fig. 21 is an elevation of the work pivot and a vertical section of the locking device.
Figure 20:
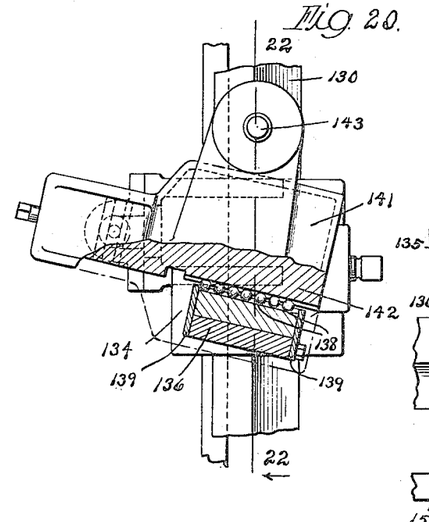
Fig. 20 is a plan thereof.
Figure 22:
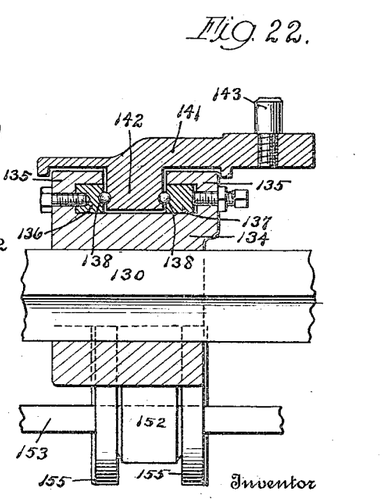
Fig. 22 is a section on the line 22—22 of Fig. 20.

A modified diagram is shown in Fig. 12, which discloses a heavy lever 100 supported on a pivot 101 and having a short arm 102 carrying a pivot 103 for the work support 17 and a long arm 104 having a pivot 105 at its end that connects by means of a link 106 to the work holder near the work pivot 24. So long as the line 3—24 is at right angles to the plane of shear, there will be no pull on the work support or pivot 103. If, however, the work pivot is at the point 24$^a$, the cutters will tend to run on the line of a decreasing spiral and pull hard along the line connecting the points 3 and 24$^a$, causing a pull on the pivot 103, and causing the arm 104 to swing away from the line 3—103, carrying with it the work pivot which soon reaches the point 24 when the pull of the cutters stops. Similarly, the location of the work pivot at 24$^b$ will produce a thrust on the work against its pivot and therefore against the pivot 103, forcing the pivot 105 toward the line 3—103 and moving the work pivot over to coincide with the point 24.

Where the sheets to be cut and the rotary shear frame are of such size that the sheet can be revolved entirely within the throat of the shear frame, the construction shown in Figs. 14, 15 and 16 may be employed. In this structure, the lower portion 110 of the main frame has secured to it several pairs of brackets 111 supporting the cross-bars 112. A guide bar 113 is secured to these cross-bars by means of screws 114, and slidable thereon is a base 115 which may be secured at any desired point along this guide rod by means of the screw 116. On this base 115 is mounted a pivot 117 which supports and guides a plate 118 which carries the pivot 119 for the work 120. As shown in Fig. 15, the movement of the base 115 and the work-pivot 119 along on the guide bar 114 is at right angles to the plane of shear, and the pivot 117 is at one side of this radial line.

As the direction of rotation of the cutters is taken as opposite to that in the diagram Fig. 11, the pivot 117 will be on the opposite side of the line connecting the line of shear with the work-pivot 119, but the action of this device will be the same as those previously described, for the pull or push exerted on the work will tend to swing the work-pivot toward the line connecting the line of shear and the pivot 117.

Figures 8, 9, 10:
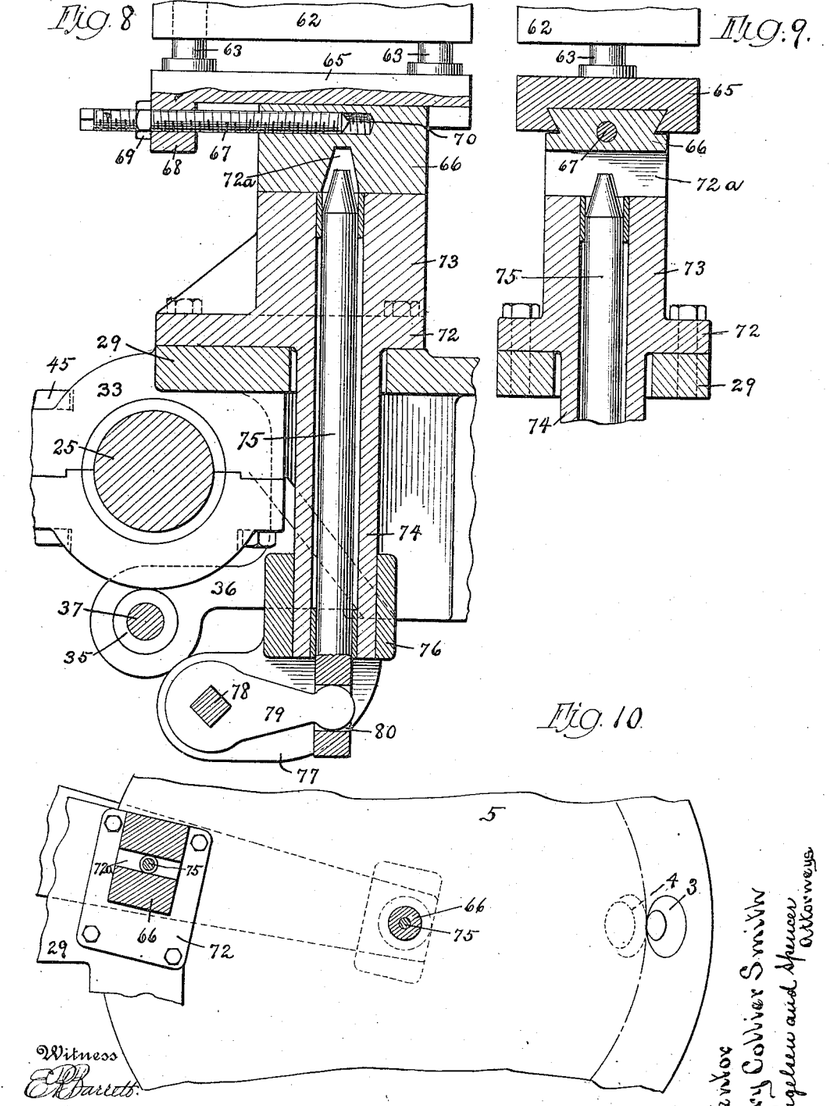
Figs. 8, 9 and 10 are details of the centering mechanism for the work holder.

In place of the centering and locking mechanism previously described and shown in Figs. 8 and 9, a bar 122 is provided and formed with slots 123 into which the pins 124, carried by the plates 112, extend. Movement of this bar away from the cutters 3—4 will carry it toward the plate 118 which is provided with a straight edge, and this engagement between the plate 118 and the bar 122 will hold the work-pivot 119 in substantially central position during the time the cutters are at rest. A link 126 connects this bar to the clutch-controlling lever 127 of the shear, which moves toward the cutters when the shear is started, thereby moving the bar 122 out of engagement with the plate 118 and releasing the work-pivot. It will be apparent that the inclination of the slots 124 will depend upon the direction the lever 127 moves to start and stop the cutters.

In Figs. 17 to 22 inclusive, a construction is shown in which the work-pivot moves in a straight path that obliquely crosses a line at right angles to the plane of shear. A supporting and guiding bar 130 extends outwardly from the main frame 131 of the rotary shear and its outer end may be carried by a pedestal 132, if desired. Slidable thereon is the carriage 134, which may be locked in place by means of the set-screw 133. This carrier is formed with upwardly extending flanges 135 which support the guide bars 136 and 137 that are properly grooved to receive the balls 138. Plates 139 may be secured to these flanges to prevent the balls from escaping.

An upper carriage 141 is formed with a rib 142 that extends down between the guide bars 136 and 137 and is also formed with grooves to receive the balls 138. This upper carriage 141 can therefore move across the lower carriage with very little friction and its direction will depend upon the stresses exerted upon the work-pivot 143 mounted on the carriage 141, a pull on the pin 143 moving the pivot in one direction and a thrust moving it in the other direction across or toward a line passing from the line of shear of the cutters parallel to the supporting bar 130.

Projecting from the upper carriage 141 is a bracket 146 provided with a dove-tail groove in its lower face in which the block 147 is slidably mounted. This block is adjustable by means of the screw 148 and has a transverse groove 149 in its lower face to receive the pin 150, similar to the groove 72$^a$ in the block 66 that is adjustable by means of the screw 67, the groove 72$^a$ receiving the pin 75 as before described.

The lever 152 is similar to the lever 79, and is mounted on the square shaft 153 that is slidable in the sleeves 154 journaled in the brackets 155 extending down from the carriage 134. One end of this shaft may be journaled in the main frame 131, and has secured to it a crank arm 156 that connects to the crank arm 157 on the shaft 89 by means of the link 158. This shaft 89 may be operated in the same manner and by the same mechanism as the shaft 89 shown in Fig. 13.

So long as the cutters are at rest, the pin 150 will be in its upper position and hold the work-pivot 143 at approximately the proper position until the lever 12 is moved to start the cutters. This action releases the pin 150 and the work-pivot may be moved transversely to carry it to correct position accordingly as the stress is a push or a pull. In this case as in the others, the work-pivot will move transversely to a line at right angles to the plane of shear until it comes to rest in said line.

In each of these constructions a pair of rotary metal working tools operate in combination with a work-pivot or support, and adjust said pivot through a radial movement of the sheet metal being machined, means being provided if desired for locking the work support in approximately the proper position while the tools are at rest, during which time new work is being positioned.

Many other changes in the proportions and details of machines embodying this present invention can be made by those skilled in designing metal-working tools without departing from the spirit of such invention, so long as the pivot for the work is permitted to swing transversely to a line at right angles to the plane of operation of the machine and is given this movement through the medium of the work in the machine. It will be understood that while rotary cutters are shown, this invention is not limited thereto but may be used in connection with any desired rotary metal working tools, cutters being selected as good examples.

I claim:—

1. In a machine for working sheet metal, the combination with rotary metal working tools, of means for supporting the work, a rigid frame on which the work support is rotatably mounted, and a normally rigid pivot upon which the frame is rotatably mounted, the work-supporting pivot being located between the rotary tools and the pivot for the frame, but on one side of the line connecting them.

2. In a machine for working sheet metal, the combination with rotary metal working tools, a rotatable work-engaging device, a rigid supporting frame for the work engaging device, and a normally rigid pivot on which said frame is rotatable to permit lateral movement of the work engaging device, the axis of the work engaging device being at that side of a line connecting the metal working tools and the pivot for said frame from which the work is fed to the tools.

3. In a machine for working sheet metal adapted for use with rotary cutters, the combination of a carriage, means to move it toward and from the cutters, a normally stationary pivot thereon, a rigid support rotatably mounted on said pivot, an engaging device for the sheet metal pivotally mounted on said support and located between the cutters and said pivot but at one side of the line connecting them, and means for preventing the movement of the support around its pivot.

4. In a machine for working sheet metal, the combination of a stationary pivot, a rigid work support mounted on said pivot, a rotatable carrier for the work mounted on said support intermediate the pivot for the work support and the cutters and on that side of a line between the two from which the work moves toward the cutters.

5. In a machine for working sheet metal, the combination of a bed, parallel guides mounted thereon, a carriage slidable on said guides, means to move said carriage, a vertical pivot rigidly mounted on said carriage, a rigid U shaped work support mounted intermediate its ends on said pivot and having a rotatable engaging device for the work at its open end at one side of a line extending from the pivot for the support to the operative portions of the metal working tools.

6. In a machine for working sheet metal, the combination of a bed, guides mounted thereon, a carriage slidable on said guides, means to move said carriage, a vertical pivot rigidly mounted on the carriage, a rigid U shaped work support on said pivot and having a rotatable engaging device for the work at its open end on that side of a line extending from the pivot on the carriage to the metal working tools from which the work moves toward the tools.

7. In a machine for working sheet metal, the combination of a bed, guides mounted thereon, a carriage slidable on said guides, means to move said carriage, a vertical pivot rigidly mounted on the carriage, a rigid U shaped work support on the pivot and having a rotatable engaging device for the work at its open end on that side of a line extending from the pivot on the carriage to the metal working tools from which the work moves toward the tools, and means for preventing the support from swinging on its pivot while the tools are at rest.

8. In a machine for working sheet metal, the combination of a bed, guides mounted thereon, a carriage slidable on said guides, means to move said carriage, a vertical pivot rigidly mounted on the carriage, a rigid U shaped work support on the pivot and having a rotatable engaging device for the work at its open end on that side of a line extending from the pivot on the carriage to the metal working tools from which the work moves toward the tool, and means mounted on the carriage to engage the work support and hold it while the tools are at rest and to disengage said support while the tools are in operation.

9. In a machine for working sheet metal, the combination of a bed, guides mounted thereon, a carriage slidable on said guides, means to move said carriage, a vertical pivot rigidly mounted on the carriage, a U shaped work support on the said pivot and having a rotatable engaging device for the work at its open end on that side of a line extending from the pivot on the carriage to the metal working tools from which the work moves toward the tools, means to control the operation of the cutting tools, means mounted on the carriage to engage the work support to prevent it from swinging and to disengage the support to permit it to swing, and connections between said controlling means and the support engaging means whereby the engaging means is inoperative during the time the cutting tools are in operation.

10. In a work support for sheets from which circles are to be cut by means of a pair of co-acting revolving cutters, the combination of a rotatable support for such sheets, a rigid carrier for the rotatable support and a pivot for such carrier permitting the carrier to swing and the rotatable support for the work to move in a line transverse to that connecting the line of shear of the cutters with the pivot for the carrier.

11. In combination with rotary metal working tools, a freely rotatable work support positioned by said tools through the medium of the material being cut, and freely rotatable work holders mounted on said work support.

12. In combination with metal working tools, a freely rotatable work support adjustably positioned through the pull imparted to the work by said tools, and freely rotatable work holders mounted on said work support.

13. In combination with rotary metal working tools, a freely rotatable work support adjustably positioned through the stress imparted to the work by said tools and freely rotatable work holders mounted on said work support.

14. In a device of the class described, a work support, means for supporting such work support to permit free and unobstructed movement of the same about a pivotal axis, a work holder mounted on said support and arranged for free and unobstructed rotation with relation to such support, rotary working tools arranged adjacent said work holder and adapted to operate upon work placed upon said holder, said work support being automatically positioned by the action of the tools upon the work.

15. In combination with rotary metal working tools, pivoted means to revolubly support the work which means are rotated on its axis by the radial movement of the material operated upon, and freely rotatable work holders mounted on the work support.

16. In combination with metal working tools, a rotatable work support swung about its axis by the radial movement of the material being formed through the action of the metal working tools, and freely rotatable work holders mounted on the work support.

17. In combination with rotary cutting rolls, a work support adjustably actuated by the radial movement of the material being cut caused by the action of metal working tools, and freely rotatable work holders mounted on the work support.

18. In a machine for working sheet metal, the combination with rotary cutting rolls, a rigid work support, a stationary pivot on which said support is rotatably mounted, said support being revoluble on its pivot by the radial stresses caused by the action of the cutting rolls on the material being cut, a rotary work holder mounted on the work support, means to start and stop the rolls, and a locking device for the work support connected to said stopping mechanism for the rolls to hold the work support in proper position to receive the work to be cut.

19. In a machine for working sheet metal, the combination of a pair of shafts, a metal working tool on each shaft, starting and driving mechanism for said shafts, a rigid rotatable work support, a normally stationary pivot on which said support is mounted, said pivot being positioned at one side of the vertical planes of the shafts of said tools, a rotatable work holder mounted on the support through which said support may be adjusted by means of the radial stresses imparted to the work by said tools, means to lock said support from turning, and means connected to the starting mechanism for releasing said support when the rolls are started.

20. In a machine for working sheet metal, the combination of a pair of shafts, a metal working tool on each shaft, a rigid rotatable work support, a normally stationary pivot on which said support is mounted, said pivot being positioned at one side of the vertical planes of the shafts of said tools, a rotatable work holder mounted on the support through which said support may be adjusted by means of the radial stresses imparted to the work by said tools, means to lock said support from turning, and means for releasing said support when the rolls are started.

21. In a machine for working sheet metal, the combination with rotary metal working tools, of means for supporting the work, a frame on which the work is rotatably mounted, and a normally rigid pivot upon which the frame is directly and rotatably mounted, the work-supporting means being located between the rotary tools and the pivot for the frame, but on one side of the line connecting them, the radial stresses imparted to the work-supporting frame being adapted to swing the work-supporting means transversely of said line when a non-circular path is being followed by the metal working tools and to hold said work-supporting frame rigid on its pivot when a circular path is being followed by said tools.

22. In combination with rotary metal working tools, a rigid freely rotatable work support, a rigid pivot for said support, work engaging devices mounted on said support in such a manner that the work may rotate on the support, the position of the pivot of said work engaging device being at one side of the line connecting the pivot of the work support and said tools, so that radial stresses on the work are eliminated so long as the metal working tools are following a circular path on said work.

23. In combination with rotary metal working tools, a freely rotatable work support, a pivot for said support, a rotary work engaging device mounted on said support, the axis of said rotary work engaging device being on one side of the line connecting the metal working tools with the pivot for the work support, the action of said metal working tools on the work engaging device being to force the axis of said device toward said line when the path of the metal working tools on said work is a decreasing spiral and to force said axis away from said line when said path is an increasing spiral and to hold said work engaging device stationary when said path is a circle.

In testimony whereof I sign this specification.

HENRY COLLIER SMITH.